Nov. 13, 1962  J. W. SHERWEN  3,063,546
VIBRATORY EQUIPMENT

Filed Nov. 23, 1959  5 Sheets-Sheet 1

INVENTOR
JOSEPH WILLIAM SHERWEN
BY
Kirschstein, Kirschstein & Ottinger
ATTORNEYS Nov. 13, 1962 J. W. SHERWEN 3,063,546
VIBRATORY EQUIPMENT
Filed Nov. 23, 1959 5 Sheets-Sheet 2

INVENTOR
JOSEPH WILLIAM SHERWEN
BY
Finschtein, Finschtein & Ottinger
ATTORNEYS

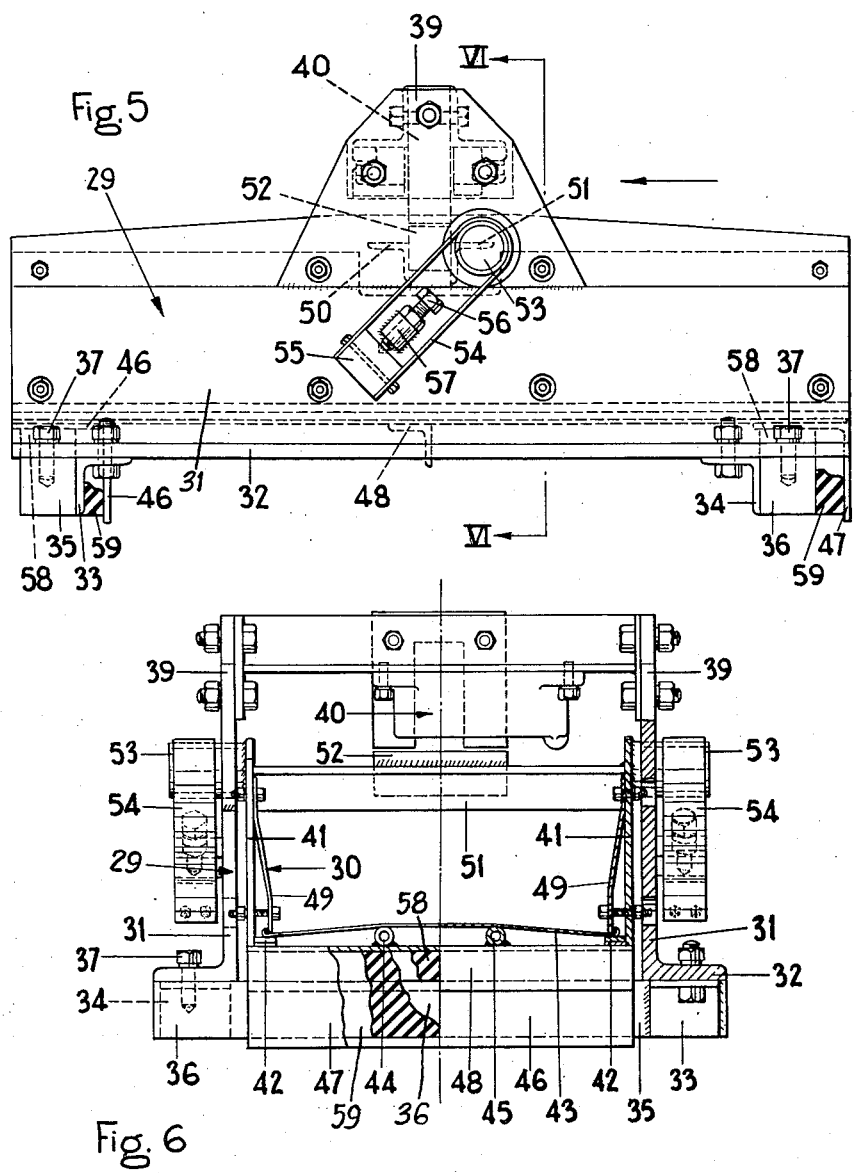

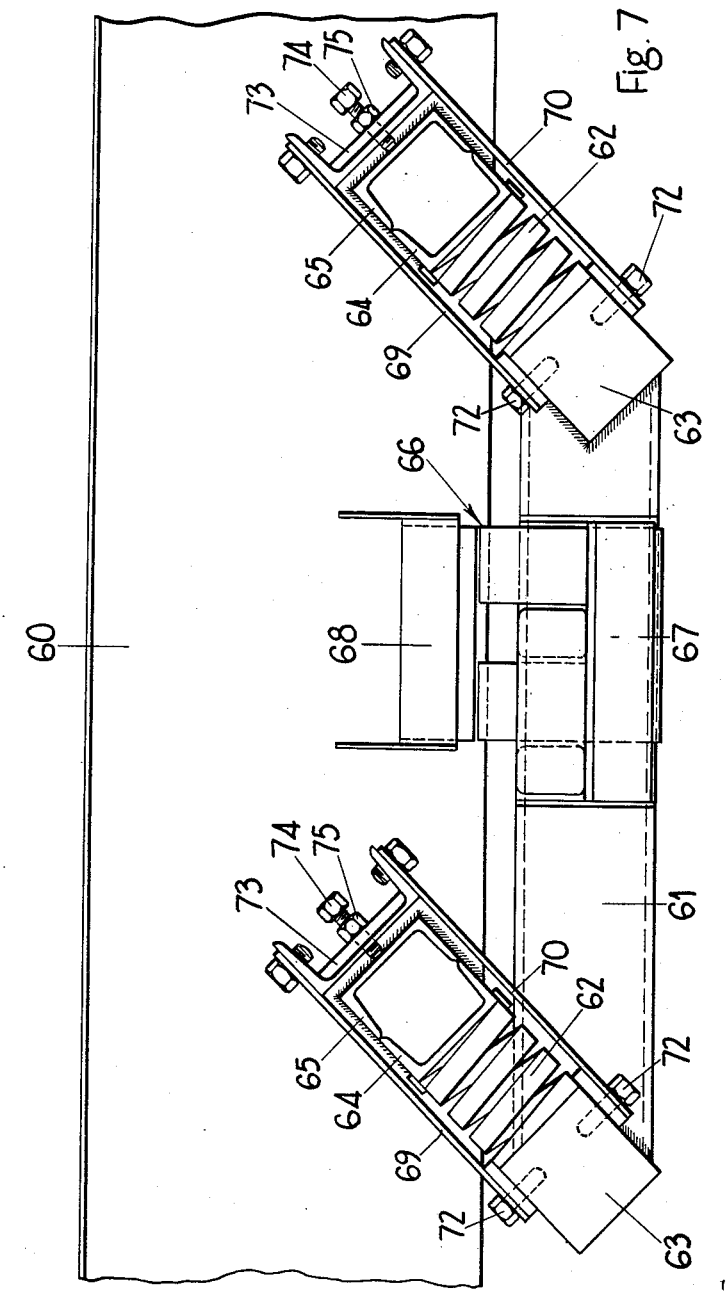

United States Patent Office 3,063,546
Patented Nov. 13, 1962

3,063,546
VIBRATORY EQUIPMENT
Joseph William Sherwen, Bexley, England, assignor to The General Electric Company Limited, Kingsway, London, England
Filed Nov. 23, 1959, Ser. No. 854,836
Claims priority, application Great Britain Nov. 28, 1958
18 Claims. (Cl. 198—220)

The present invention relates to vibratory equipment, such as vibratory conveyors, feeders and screens, of the kind comprising a support member for material in the form of a deck, trough or pipe which is arranged to be vibrated. If the equipment is a conveyor or feeder the deck is vibrated to cause the material to move along the support means. If the equipment is a screen the support means is in the form of a mesh so that part of the material falls through the screen while the rest of the material either passes along the mesh or is maintained substantially in its initial position on the screen, depending on the form of the vibrations.

According to the present invention vibratory equipment comprises a support member for material, an undercarriage member, resilient means through which the support member is mounted on the undercarriage member so that the resilient means assist in vibrating the support member, and inextensible linkage means making a connection with the undercarriage member and with the support member in such manner that the support member is constrained to follow a predetermined path relative to the undercarriage member during vibration.

In one form of my invention the undercarriage member is arranged for vibration in a predetermined direction and the resilient means arranged to transmit the vibration to the support member. In another form of my invention, the support member is arranged for vibration by say an electromagnetic vibrator directly to effect movement of the support member in one direction that is over one half cycle the resilient means providing the restoring force to return the support member to its initial position.

In order that the present invention may be readily understood four embodiments thereof will now be described by way of example with reference to the eight figures of the accompanying diagrammatic drawings.

In the drawings, FIGURE 1 shows a side elevation of a pipe conveyor and FIGURE 2 shows an end elevation looking from the left to the right of FIGURE 1.

FIGURE 5 shows a side elevation of a vibratory screen and FIGURE 6 shows a half sectional view on the line VI—VI of FIGURE 5 and a half end elevational view.

FIGURES 7 and 8 show a side elevation and an end elevation respectively of a modified screen.

Figure 1:
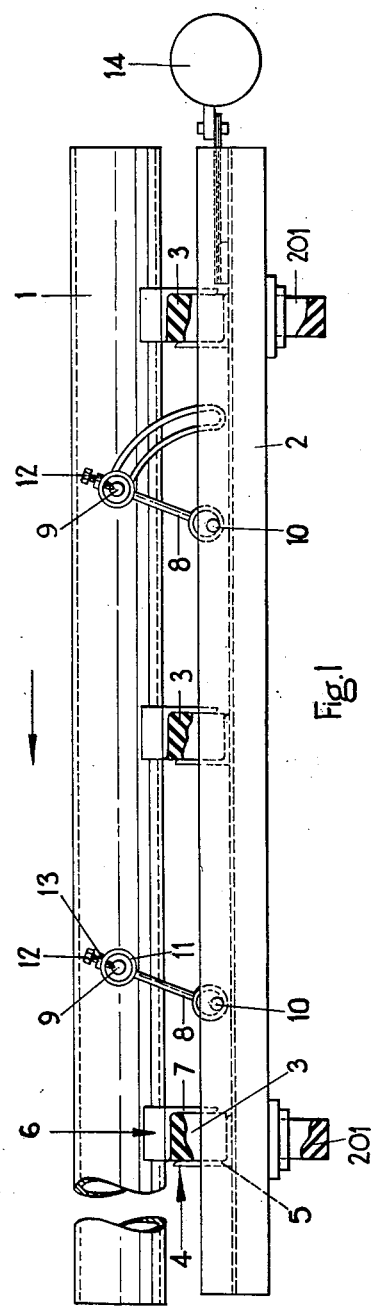
Figure 2:
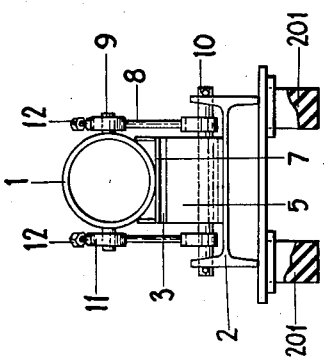

Referring now to FIGURES 1 and 2 of the drawings, the pipe conveyor includes a pipe 1, through which material is conveyed, mounted on an undercarriage 2 through resilient means 3 in the form of rubber blocks. The undercarriage is a horizontally disposed beam of H cross section having the horizontal legs of angle pieces 4 secured to its cross-piece, i.e., the horizontal web, at intervals along its length. Seated on the horizontal leg of each of the angle pieces 4 with one of its vertical faces against the upstanding leg 5 of the angle piece 4 is one of the rubber blocks 3, said vertical face extending slightly above the top edge of the upstanding leg 5. The pipe 1 is supported on the rubber blocks 3 through brackets 6 secured to the underside of the pipe 1. These brackets 6 each have a horizontal leg resting on the top face of a rubber block 3 (see FIG. 2) and a downwardly extending leg 7 abutting against the opposite vertical face of said block to sandwich, so to speak, the rubber block 3 between the legs 5 and 7 of the angle piece 4 and the bracket 6, the leg 7 extending almost to the lower edge of the side of the rubber block 3. The brackets 6 have cradle arms upstanding from the horizontal legs thereof and engaging opposite sides of the pipe (see FIG. 2).

Parallel links in the form of rods 8 connect the pipe 1 to the undercarriage 2, these links being pivotally mounted at one of their ends in pins 9 secured to the pipe 1 and forming a rolling connection at their other end with rollers 10 mounted on the undercarriage 2, each roller 10 extending parallel to the cross-piece of the H-sectioned beam and being rotatably mounted towards its ends in the uprights of the H-sectioned beam. To effect the connections of the rods 8 they have collars 11 at their ends which fit around the pins 9 and rollers 10. The collars 11 are of a considerably larger diameter than the pins 9 and rollers 10, and to form the pivotal connections with the pins 9 tension bolts 12 are screwed through the collars 11 and have their pointed ends located in grooves in the pins 9; lock nuts 13 are provided on the bolts 12 to lock the tension bolts 12 in position after they have been screwed to a desired position. This arrangement enables an initial compression of the rubber blocks 3 to be made by adjustment of the tension bolts 12. This initial compression of the rubber blocks 3 holds the rollers 10 against the collars 11 during operation of the conveyor. The angle at which the links 8 are set relative to the undercarriage 2 is adjustable as is indicated by the right hand link visible in FIGURE 1.

A mechanical or electromagnetic vibrator 14 is provided for vibrating the undercarriage 2 longitudinally. The undercarriage 2 is of course supported in a manner permitting this longitudinal vibration by shock absorbers 201.

To set up the conveyor for operation the rubber blocks 3 are compressed by adjustment of the tension bolts 12 to an extent ensuring that the collar 11 is always up against the rollers 10. The number and strength of the rubber blocks 3 is chosen to give a natural frequency, after slight compression, somewhere near the frequency of the vibrator and the final adjustment of the frequency is obtained by adjustment of the links 8 by the tension bolts 12.

Considering the conveyor to be in the position shown in FIGURE 1 the initial vibratory movement of the undercarriage is to the right. The pipe 1 has a fairly large inertia so that this movement causes compression of the rubber blocks 3 in the longitudinal direction of the undercarriage 2 between the angle pieces 4 and the brackets 6 and an elongation of the rubber in a direction transverse to the undercarriage 2 tending to lift the pipe 1. At the same time the rollers 10 are moving horizontally to the right with the undercarriage 2 to rotate each end of the links 8 about the pivotal axis of the pins 9 at its upper end. This force can be resolved into a direction parallel to the lines of the links 8 and at right angles to the lines of the parallelogram links 8. Since the links 8 are inextensible the component of force along the line of links 8 has no effect so that the only effective force on the pipe 1 is at right angles to the links. Hence the longitudinal axis of the pipe 1 moves parallel to itself and at right angles to the links 8. In other words the pipe 1 follows the direction at which the angle of the links is set. The pipe 1 therefore has an upward and forward movement i.e. upwards and to the left in FIGURE 1, the proportion of upward movement to forward movement decreasing as the links 8 approach a vertical position. This movement throws the material in the pipe forward and upwards (to the left). When the undercarriage 2 moves in the reverse direction, the rubber blocks 3 relax and opposite movement of the pipe 1 takes place to return the pipe 1 to its natural position along the same path.

Thus the material lands in a position forward (to the left) of its original position.

Instead of using rubber blocks 3 as described above springs may be used. The vibrator may be either mechanical or electromagnetic and in the case of a mechanical vibrator it can be arranged to have a variable amplitude.

Figure 3:
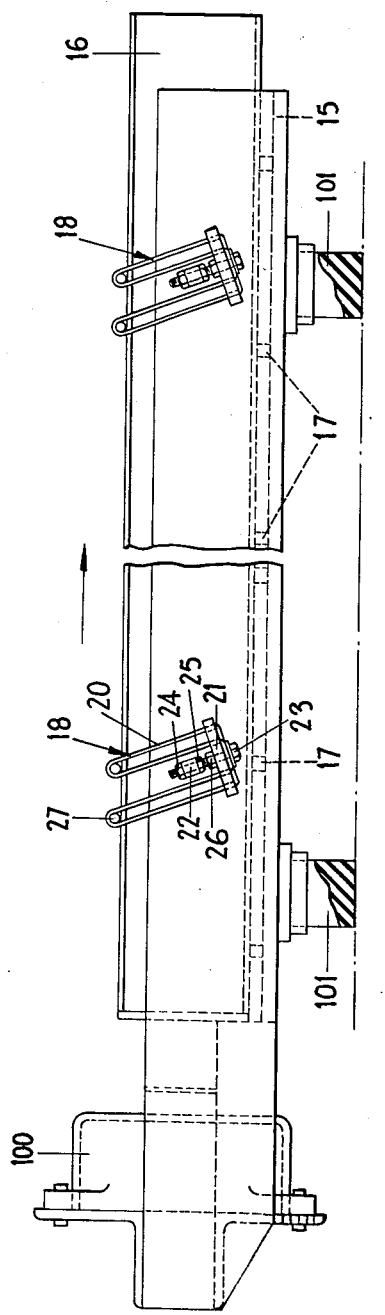
FIGURES 3 and 4 show a side elevation and an end elevation respectively of a trough conveyor.
Figure 4:
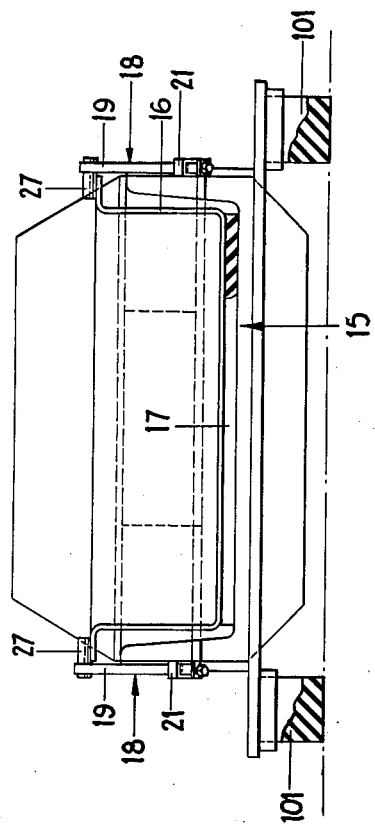

Referring now to FIGURES 3 and 4 of the accompanying drawings a trough conveyor is illustrated. This conveyor has an undercarriage 15 supporting a trough 16 through rubber blocks 17 which extend transversely of the trough 16 at intervals along its length. The rubber blocks 17 are again mounted between angle pieces and brackets in the same manner as those of FIGURES 1 and 2 but these angle pieces and brackets have not been shown in FIGURES 3 and 4. The undercarriage 15 is mounted on rubber blocks 101 which permit longitudinal vibration of the undercarriage by the electromagnetic vibrator 100. As in the arrangement of FIGURES 1 and 2 the material support member, in this case the trough 16, and the undercarriage 15 are connected to each other by links but this time by links 18 of a different form to those shown in FIGURES 1 and 2. The links 18 are strap links each comprising a strap formed into two loops 19 and 20 through a block forming a bridge piece 21. The bridge pieces 21 are secured to lugs 22 on the undercarriage by bolts 23 and nuts 24, 25 and 26. The loops pass around pins 27 secured at intervals to the flanged edges of the trough 16, to form in effect a pivotal connection between the loops 19 and 20 and the pins 27.

The conveyor is set up for operation in a manner similar to that for the conveyor of FIGURES 1 and 2. The initial compression is set up in the rubber blocks 17 by adjustment of the bolts 23.

The operation of the conveyor is the same in principle as that of FIGURES 1 and 2 in that the vibratory motion of the undercarriage is transmitted to the trough through the rubber blocks 17 and the motion of the trough is constrained by the links in such manner that the trough follows the direction at which the angle of the links is set.

Referring now to FIGURES 5 and 6, a vibratory screen is illustrated. This has an undercarriage 29 supporting a screen frame 30 through resilient means as will be described.

The undercarriage 29 has side plates 31 formed with feet 32. Bolted to the underside of the feet 32 are angle pieces 33 at one end of the undercarriage and angle pieces 34 on the other end of the undercarriage. To these angle pieces 33 and 34 are welded bars 35 and 36 which extend across the undercarriage beneath the screen frame 30, the bars in addition being secured to the feet 32 by bolts 37. The slide plates 31 have extension pieces 39 welded to them for supporting the core and coil of the electromagnetic vibrator indicated at 40.

The screen frame 30 has side plates 41 and feet 42 on which rest the sides of the screen mesh 43. The mesh 43 is supported across its width by tubular rods 44 and 45 which extend longitudinally of the screen and are welded at their ends to angle pieces 46 and 47, the latter being welded to the side plates 41. The rods 44 and 45 are interconnected mid-way along their lengths by an angle piece 48. Tension plates 49 are secured to the side plates 41 and impart a transverse tension to the mesh 43.

Angle members 50 and 51 extend between the side plates 41 and support the armature 52 of the electromagnetic vibrator.

Between the angle piece 46 and bar 35 and between the angle piece 47 and the bar 36 are located rubber blocks 58. Between the angle pieces 33 and 46 and between the bar 36 and the angle piece 47 are located rubber blocks 59.

Pins 53 are welded to the side plates 41 and extend through apertures in the extension pieces 39. Around these pins 53 pass looped straps 54. The ends of each strap 54 are secured to a block 55. The blocks 55 have grooves in which are located the pointed ends of tension bolts 56 which are screwed into lugs 57 in the side plates 31. Thus the screen frame 30 is connected to the undercarriage 29 by inextensible links pivoted at their lower ends.

To set up the screen for operation an initial compression is set up in the rubber blocks 56 and 59 by adjustment of the tension bolts 56.

In operation, the electromagnetic vibrator attracts the armature to tend to move the screen frame 30 vertically upwards. However due to the presence of the links it cannot do so, the links constraining it to move in a direction such that they themselves are rotated about the pointed ends of the tension bolts 56. Thus the screen has an upward and forward movement i.e. and upward movement and movement to the left in FIGURE 5. This movement compresses the rubber blocks 59 and also causes a shearing deformation of the rubber blocks 59. When the vibrator is de-energised, the restoring force in the block 59 returns the screen frame 30 to its initial position.

Figure 8:
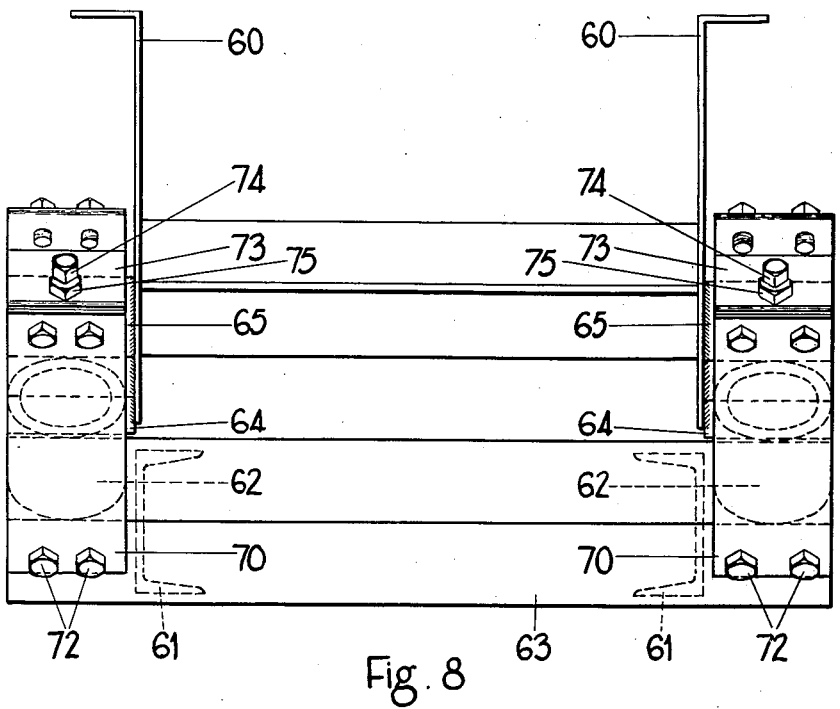

Referring now to FIGURES 7 and 8 which show a modified form of screen to that shown in FIGURES 5 and 6, a screen frame 60 is supported on an undercarriage 61 through coiled springs 62 which are secured at one end to blocks 63 welded to the undercarriage and at the other end to brackets 64 welded to the screen frame 60 together with brackets 65. An electromagnetic vibrator 66 has its core and coil 67 supported on the undercarriage 61 and its armature 68 on the screen frame 60.

The inextensible linkage means in this embodiment take the form of pair of parallel leaf springs 69 and 70 secured to the blocks 63 by bolts 72 and joined by a cross bar 73 at their upper ends. Each cross bar 73 has a bolt 74 screwed through it, the bolt 74 having a pointed end engaging in a groove in the bracket 65 to form a pivotal connection similar to that formed by the bolt 56 of the screen shown in FIGURES 5 and 6. A lock nut 75 is provided on each bolt 74.

In operation, the leaf springs 69 and 70 perform the same function as the straps 54 of FIGURES 5 and 6 and the springs the same functions as the rubber blocks 58 and 59. As will be appreciated due to the path of movement of the screen frame 60 not being simple motion in a direction along the lines of the springs 62 the springs 62 will not only be stressed by compression but by a bowing action, that is to say the coils of the spring will be deflected out of line, and both these forms of stressing will act to restore the screen to its intial position when the electromagnetic vibrator 66 has effected movement of the screen frame 60 over one half cycle of its vibrating movement.

In a further modified form of screen, springs 62 are similarly mounted to those in FIGURES 7 and 8 but each pair of leaf springs 69 and 70 are replaced by the strap arrangement of FIGURES 5 and 6.

In another modification spring rods replace the rubber blocks and angle irons or springs of FIGURES 1 to 8, these rods extending across the width of the support member as the rubber blocks do being secured at their ends to the undercarriage and at points intermediate their ends to the support member. Their action is a flexing action transverse to their lengths.

I claim:

1. Vibratory equipment comprising: a support member for material, an undercarriage member, an upper element attached to the support member, a lower element attached to the undercarriage member, said elements being spaced apart from one another, resilient means directly interposed between said upper and lower spaced elements, said upper and lower spaced elements having parts thereof engaging upper and lower opposed parts, respectively, of the resilient means, said resilient means mounting the support member on the undercarriage member so that the resilient means assists in vibrating the support member, linkage means having a fixed length during operation, and connections between the linkage means and the undercarriage member on the one hand and between the linkage means and the support member on the other hand in such manner that the support member is constrained to follow a predetermined path relative to the undercarriage member during vibration, the line between said connections being aperpendicular to the direction in which the resilient means extends between said parts of said upper and lower spaced elements so that the resilient means places the linkage means in tension, the connection between said linkage means and one of said members comprising adjustable means to vary the length of the linkage means between said connections so as to change at will the tension in the linkage means whereby to provide for control of the initial stress in the resilient means.

2. Vibratory equipment as claimed in claim 1, wherein the linkage means comprise pairs of parallel leaf springs each secured to one of said members at one end and being connected to a cross bar pivotally connected to the other of said members at the other end, a coiled spring extending longitudinally of and between each pair of leaf springs and being connected at one end to one of said members and at the other end to the other of said members.

3. Vibratory equipment as claimed in claim 1, wherein the linkage means comprise rods extending parallel to each other between their connections to the support member and the undercarriage member, the connection of each rod to one of said members being a pivotal connection.

4. Vibratory equipment as claimed in claim 3, wherein the pivotal connection comprises a screw threadedly engaging a collar at one end of the rod whereby it is adjustable to provide for said control and having a pointed end engaging in a groove in a projection from said one of said members, the screw being able to rock on the pointed end in said groove.

5. Vibratory equipment as claimed in claim 4, wherein the undercarriage member is arranged for longitudinal vibration, the resilient means being arranged to transmit vibration to the support member.

6. Vibratory equipment as claimed in claim 5, wherein the resilient means comprise rubber blocks spaced at intervals along the length of the undercarriage member and constrained to be compressed and to relax alternately by vibratory movement of the undercarriage member the compression distorting the rubber blocks in a direction transverse to the direction of vibration to displace the support member in a first direction from a natural position and relaxation permitting the support member to return to its natural position.

7. Vibratory equipment as claimed in claim 3, wherein the angle at which the rods are set relative to the undercarriage member is adjustable.

8. Vibratory equipment as claimed in claim 1, wherein the linkage means comprise inextensible straps under tension and extending parallel to each other between their connections to the undercarriage member and the support member.

9. Vibratory equipment as claimed in claim 8, wherein each strap is in the form of two loops each engaging around a respective pin over which the straps are slidable to form a pivotal connection to one of said members and being connected to a block at the junction of the two loops connected to the other of said members.

10. Vibratory equipment as claimed in claim 9, wherein the connection of the block to said other of said members is by a screw, threadedly engaging said block and a lug on said other of said members whereby it is adjustable to provide for said control.

11. Vibratory equipment as claimed in claim 9, wherein the undercarriage member is arranged for longitudinal vibration the resilient means being arranged to transmit vibration to the support member.

12. Vibratory equipment as claimed in claim 11, wherein the resilient means comprise rubber blocks spaced at intervals along the length of the undercarriage member and constrained to be compressed and to relax alternately by vibratory movement of the undercarriage member the compression distorting the rubber blocks in a direction transverse to the direction of vibration to displace the support member in a first direction from a natural position and relaxation permitting the support member to return to its natural position.

13. Vibratory equipment as claimed in claim 8, wherein the straps are in the form of loops engaging around pins to form the connections to one of said members.

14. Vibratory equipment as claimed in claim 13 wherein the straps are each in the form of a single loop secured to a block pivotally connected to the other of said members.

15. Vibratory equipment as claimed in claim 14, wherein the pivotal connection comprises a screw threadedly engaging a lug projecting from said other of said members whereby it is adjustable to provide for said control and having a pointed end engaging in a groove in said block, the screw being able to rock on the pointed end in said groove.

16. Vibratory equipment as claimed in claim 15, wherein the undercarriage is a stationary member and a vibrator carried by the undercarriage member imparts movement to the support member in one direction and the resilient means stressed by movement in said one direction provide the restoring force for moving said support member in the opposite direction.

17. Vibratory equipment as claimed in claim 16, wherein said resilient means comprise rubber blocks arranged to be subjected to compression and shearing stress by movement in said one direction.

18. Vibratory equipment as claimed in claim 16, wherein said resilient means comprise coiled springs having the coils arranged normally in line and arranged to be stressed by deflection of its coils out of line.

References Cited in the file of this patent

UNITED STATES PATENTS

| 2,806,583 | Morris | Sept. 17, 1957 |
| 2,814,379 | Sernetz | Nov. 26, 1957 |

FOREIGN PATENTS

| 1,047,708 | Germany | Dec. 24, 1958 |